UNITED STATES PATENT OFFICE.

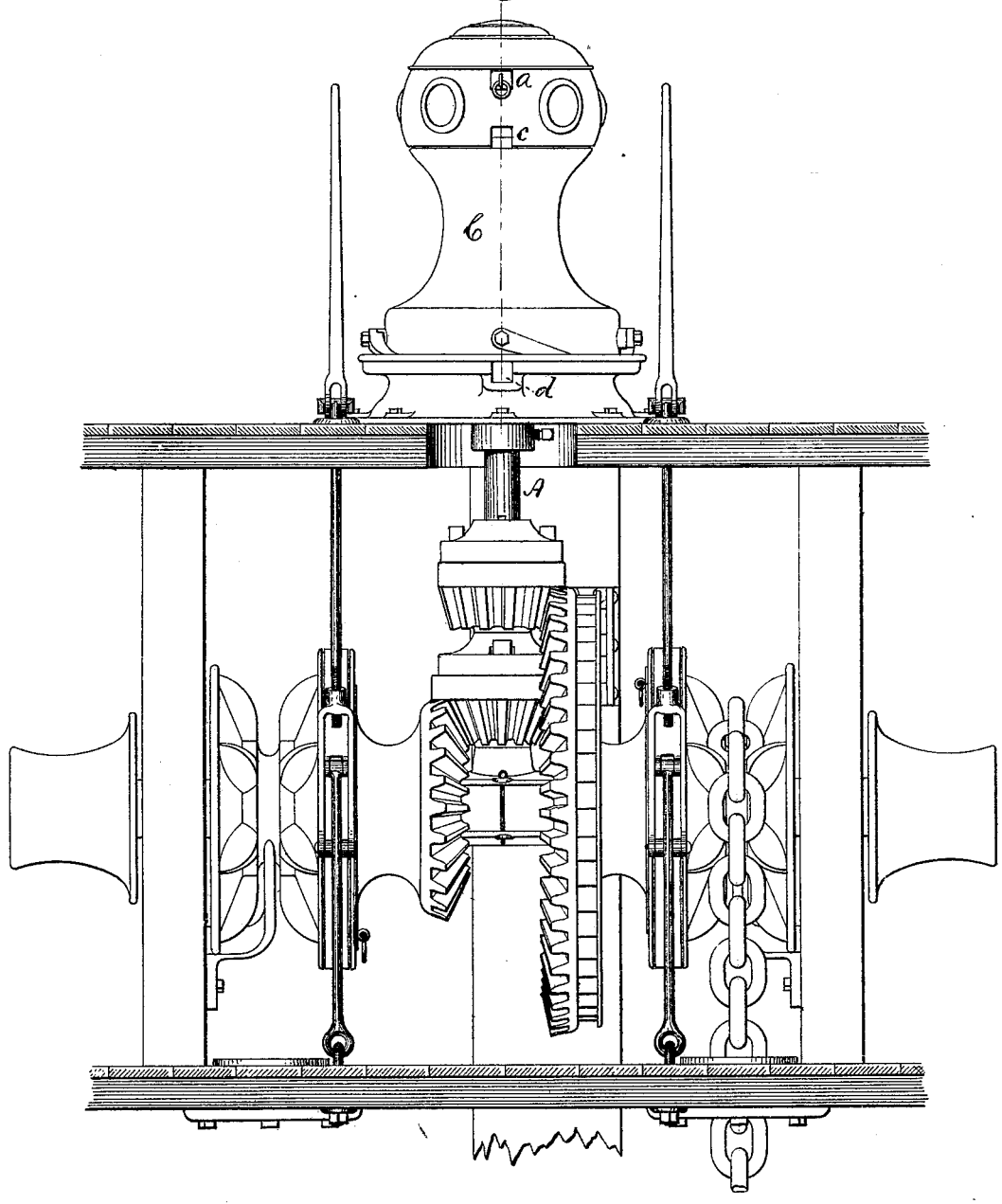

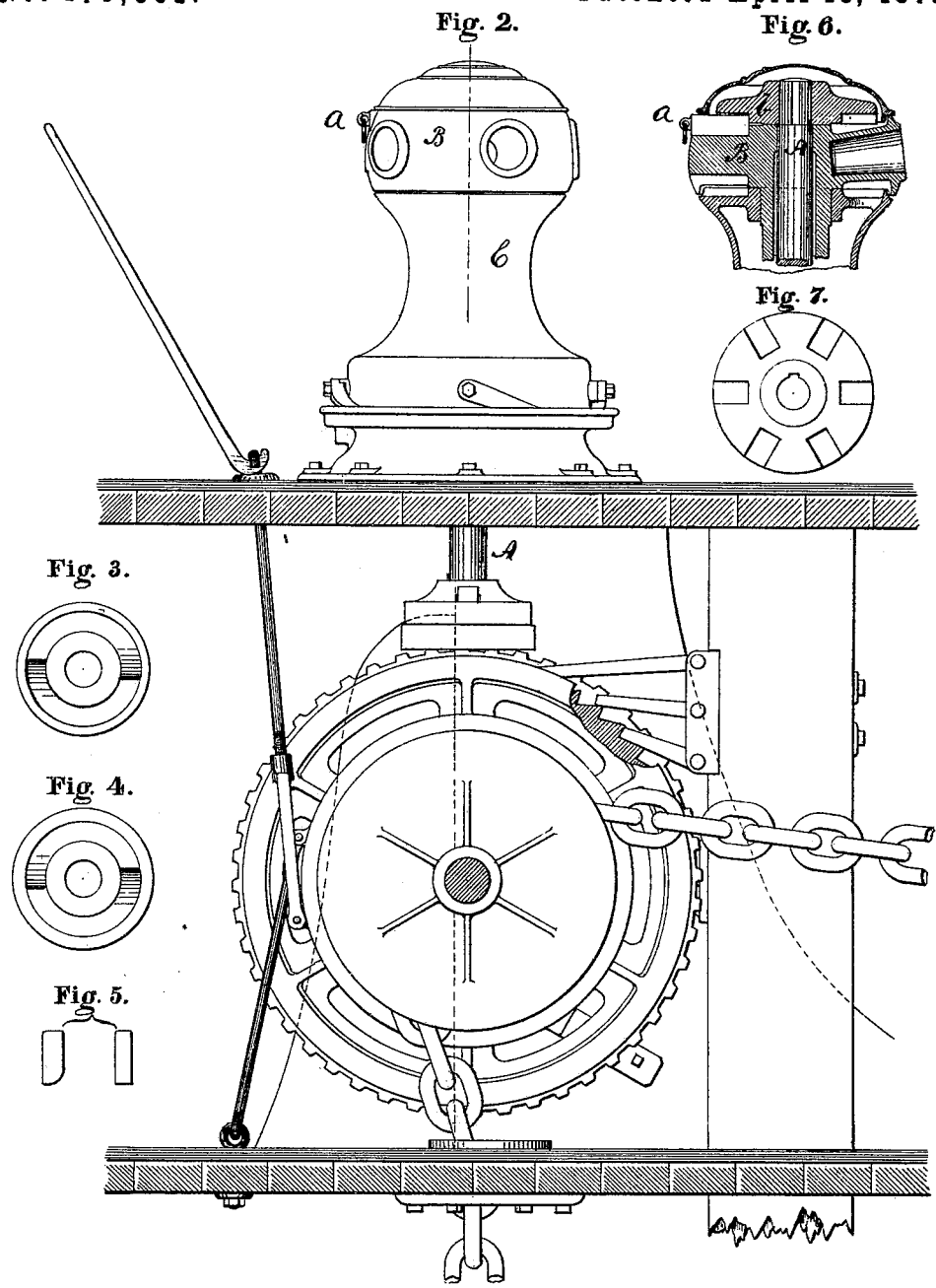

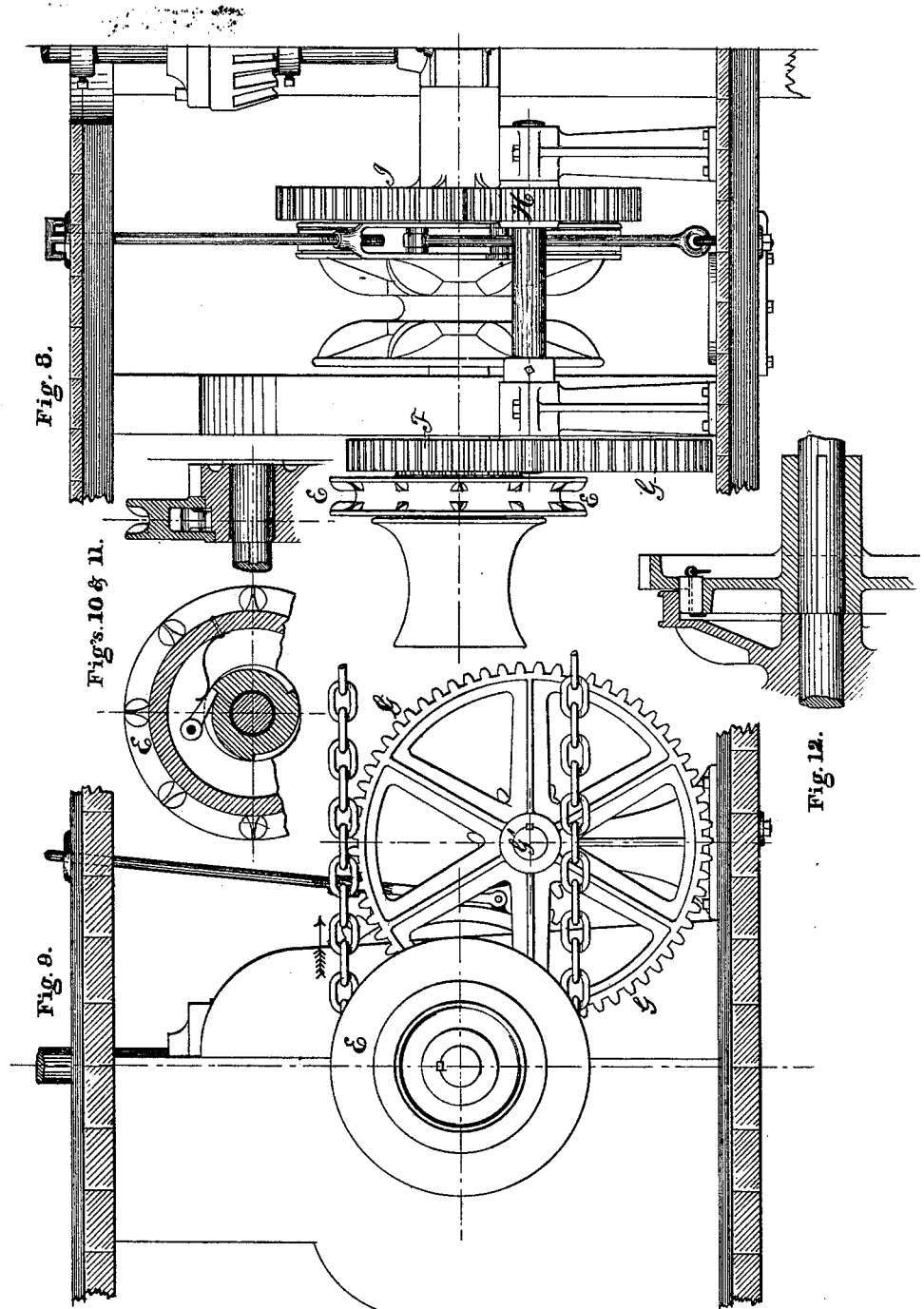

JOSEPH P. MANTON, OF PROVIDENCE, RHODE ISLAND.

IMPROVEMENT IN WINDLASSES.

Specification forming part of Letters Patent No. 176,331, dated April 18, 1876; application filed October 12, 1874.

*To all whom it may concern:*

Be it known that I, JOSEPH P. MANTON, of the city and county of Providence, in the State of Rhode Island, have invented certain new and useful Improvements in Windlasses; and I do hereby declare that the following specification, taken in connection with the drawings making a part of the same, is a full, clear, and exact description thereof.

Figure 1 is a side elevation of an Emerson windlass, with a power-capstan. Fig. 2 is an end elevation, partially sectional, of the same, looking from the starboard. Fig. 3 is a top plan of upper pinion-gear. Fig. 4 is a top plan of lower pinion-gear. Fig. 5 represents the sliding key or dog for driving the pinions. Fig. 6 is a vertical section through upper part of capstan, showing the manner of locking the windlass to the capstan or lever-head. Fig. 7 is an inverted plan of windlass-head. Fig. 8 is a port-side elevation of an Emerson windlass, with power attachment, driven by messenger-chain. Fig. 9 is an end elevation of same, looking from the port side. Figs. 10 and 11 are vertical sections of messenger-wheel and driving-pinion. Fig. 12 is a vertical section through the wild-cat and main gear, showing the manner of locking them together.

Letters Patent for certain improvements in power-capstans were granted to Henthorn and Thayer, bearing date February 17, 1874, to the specification accompanying which I refer for a description of the capstan shown at Figs. 1, 2, 6, and 7 of the present drawings, so far as it is adapted for use either as a simple or as a power capstan.

The Emerson windlass (shown at Fig. 1 of the drawings) is, as is well known, arranged to be driven by a vertical driving-shaft, which admits of the windlass being located below the deck, but can be operated from the deck.

The present invention relates to certain modifications of the capstan described in the said Letters Patent of Henthorn and Thayer, above referred to; and consists in the combination of the upright shaft and the windlass, the two directly geared together, and with the windlass-head keyed to said shaft, the power-capstan and a capstan-head revolving around said shaft, and arranged to interchangeably drive the capstan or the windlass.

In the drawings, A is the common shaft of the windlass and of the capstan. Upon the upper end of the said common shaft A, Fig. 6, a plate, $b$, is keyed. This plate $b$ constitutes the windlass-head. This windlass-head can be combined with the capstan-head B at pleasure, or disconnected therefrom, by the insertion or removal of a holding-key, $a$, and when the plate and head are so united the shaft A will be turned with the capstan-head, and movement will be given to the windlass. By removing the key $a$ from the upper seat for the same, and inserting it in the middle key-seat $c$, Fig. 1, the capstan-head becomes disconnected from the shaft A, but becomes locked with the capstan-band C, in which case the apparatus works as a simple capstan. By removing the key $a$ from the seat $c$, and inserting it in the lower seat $d$, a power-capstan is obtained, as described in the said Henthorn and Thayer patent. It will thus be seen that by employing the driving-shaft of the windlass as the shaft for the capstan, and by arranging the capstan-head so that it can be locked thereto, I am enabled to work the windlass by the same capstan-head, which, when the key $a$ is removed and inserted at $c$ or at $d$, will work the capstan, but not the windlass.

I am aware that before my invention a power-capstan has been used to work a windlass. I am also aware that a windlass has been worked by a simple capstan, furnished with two separate heads, one of which was used to drive the capstan, and the other the windlass; also, that a capstan-shaft and a windlass have been operatively connected at the windlass by means of a clutch, whereby the two might be disconnected; but I am not aware that before my invention a single capstan-head has been arranged, so that it could be used at pleasure to work a capstan or a windlass, by respectively locking the capstan-head to the capstan-barrel or to the capstan-shaft.

E, Figs. 8 and 9, is a messenger-wheel, around which runs an endless chain driven by the engine. The said wheel should be connected with a pawl-and-ratchet gear to its shaft, so that when the engine is running in the opposite direction from that in which it is required to run to drive the windlass, this wheel will turn loosely on its shaft. On the same shaft with the messenger-wheel E is a spur-gear, F, Fig. 8, which engages with the wheel G, keyed to the shaft G', and whose rotation carries the wheel H on the same shaft to drive the gear-wheel I on the windlass-shaft, and give movement to the latter. The wheel H is connected to its shaft G' by a spline, so that it can be disconnected from the wheel I at pleasure.

What I claim as my invention, and desire to secure by Letters Patent, is—

The combination of the upright shaft and the windlass, the two directly geared together, and with the windlass-head keyed to said shaft, the power-capstan and a capstan-head revolving around said shaft, and arranged to interchangeably drive the capstan or the windlass, substantially as described.

JOSEPH P. MANTON.

Witnesses:
JOHN D. THURSTON,
N. P. S. THOMAS.